United States Patent
Chen et al.

(10) Patent No.: US 11,822,805 B2
(45) Date of Patent: Nov. 21, 2023

(54) METHOD AND TERMINAL FOR RECLAIMING MEMORY AFTER FREEZING PROGRAM

(71) Applicant: HUAWEI TECHNOLOGIES CO., LTD., Guangdong (CN)

(72) Inventors: Qiulin Chen, Shanghai (CN); Bailin Wen, Hangzhou (CN); Xiaojun Duan, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 339 days.

(21) Appl. No.: 16/367,646

(22) Filed: Mar. 28, 2019

(65) Prior Publication Data
US 2019/0220216 A1  Jul. 18, 2019

Related U.S. Application Data

(63) Continuation of application No. PCT/CN2017/090005, filed on Jun. 26, 2017.

(30) Foreign Application Priority Data

Sep. 29, 2016 (CN) .......................... 201610872374.1

(51) Int. Cl.
*G06F 3/00* (2006.01)
*G06F 3/06* (2006.01)
(Continued)

(52) U.S. Cl.
CPC .......... *G06F 3/0647* (2013.01); *G06F 3/0608* (2013.01); *G06F 3/0679* (2013.01);
(Continued)

(58) Field of Classification Search
CPC .... G06F 3/0647; G06F 3/0608; G06F 3/0679; G06F 9/44594; G06F 9/485; G06F 12/0253; G06F 9/445
See application file for complete search history.

(56) References Cited

U.S. PATENT DOCUMENTS 5,717,926 A * 2/1998 Browning ............. G06F 9/4843
                                                        718/103
6,983,301 B1 * 1/2006 Carter ............... H04L 29/06027
                                                        709/200
(Continued)

FOREIGN PATENT DOCUMENTS

CN  101908022 A  12/2010
CN  102768571 A  11/2012
(Continued)

OTHER PUBLICATIONS

Anonymous: "TASK_KILLABLE: New process state in Linux", Aug. 8, 2014, XP055738281, total 5 pages.

*Primary Examiner* — Jae U Yu
(74) *Attorney, Agent, or Firm* — WOMBLE BOND DICKINSON (US) LLP (57) ABSTRACT

Embodiments of the present disclosure describe a memory reclaiming method and a terminal. As discussed with respect to the embodiments described herein, the method may include determining, by a terminal according to a preset rule, a target application program in application programs run on a background, where the target application program is an application program that needs to be cleaned. The method may also include freezing, by the terminal, the target application program, and reclaiming data generated during running of a process of the target application program in memory. The method may also include unfreezing, by the terminal when receiving an input triggering instruction for
(Continued)

Step S201: A terminal determines, according to a preset rule, a target application program in application programs run on a background Step S202: The terminal freezes the target application program, and reclaims data generated during running of a process of the target application program in memory Step S203: The terminal unfreezes, when receiving an input triggering instruction for the target application program, the target application program, and runs the target application program the target application program, the target application program, and running the target application program.

9 Claims, 3 Drawing Sheets

(51) Int. Cl.
    *G06F 9/48*     (2006.01)
    *G06F 12/02*     (2006.01)
    *G06F 9/445*     (2018.01)

(52) U.S. Cl.
    CPC .......... *G06F 9/44594* (2013.01); *G06F 9/485* (2013.01); *G06F 12/0253* (2013.01); *G06F 9/445* (2013.01)

(56) References Cited

U.S. PATENT DOCUMENTS

| | | | |
|---|---|---|---|
| 7,503,065 B1* | 3/2009 | Packingham | H04L 63/083 713/153 |
| 2007/0028240 A1* | 2/2007 | Hayakawa | G06F 11/3636 718/100 |
| 2007/0136395 A1* | 6/2007 | Fries | G06F 11/1464 |
| 2008/0077590 A1* | 3/2008 | Pandit | G06F 16/1847 |
| 2008/0313656 A1* | 12/2008 | Klein | G06F 9/545 719/320 |
| 2012/0324481 A1* | 12/2012 | Xia | G06F 9/485 719/320 |
| 2014/0179272 A1 | 6/2014 | Zhang et al. | |
| 2015/0347181 A1 | 12/2015 | Myrick et al. | |
| 2016/0011782 A1* | 1/2016 | Kurotsuchi | G06F 11/1068 711/104 |
| 2016/0098229 A1* | 4/2016 | Schreiber | G06F 9/5022 711/166 |
| 2016/0371296 A1* | 12/2016 | Passey | G06F 16/1734 |
| 2018/0307600 A1 | 10/2018 | Wang et al. | |

FOREIGN PATENT DOCUMENTS

| | | |
|---|---|---|
| CN | 104281528 A | 1/2015 |
| CN | 104503740 A | 4/2015 |
| CN | 105676993 A | 6/2016 |
| CN | 105677386 A | 6/2016 |
| CN | 105701025 A | 6/2016 |
| CN | 105843367 A | 8/2016 |
| CN | 106484472 A | 3/2017 |

* cited by examiner

FIG. 1

Step S201: A terminal determines, according to a preset rule, a target application program in application programs run on a background Step S202: The terminal freezes the target application program, and reclaims data generated during running of a process of the target application program in memory Step S203: The terminal unfreezes, when receiving an input triggering instruction for the target application program, the target application program, and runs the target application program

METHOD AND TERMINAL FOR RECLAIMING MEMORY AFTER FREEZING PROGRAM

CROSS-REFERENCE TO RELATED APPLICATIONS

This application is a continuation of International Application No. PCT/CN2017/090005, filed on Jun. 26, 2017, which claims priority to Chinese Patent Application No. 201610872374.1, filed on Sep. 29, 2016. The disclosures of the aforementioned applications are hereby incorporated by reference in their entireties.

TECHNICAL FIELD

The present invention relates to the field of computer technologies, and in particular, to a memory reclaiming method and a terminal.

BACKGROUND

Mobile device operating systems, such as Android™, are typically multitasking systems on which a plurality of application programs can be run simultaneously. In Android, for example, when a user completes use of an application program, the application program is usually not closed, but instead started processes of the application program continue to be run in a background. Next time the user uses the application program, the user does not need to restart these processes, which reduces time spent in restarting the application program. Running of each process in the background occupies corresponding memory, and a continuous increase in processes run in the background can cause insufficient memory. Consequently, normal running the mobile device operating system is affected. When memory is less than a value, a low memory killer (LMK) may reclaim memory occupied when some processes are run, to ensure normal running of the mobile device operating system.

However, after the memory is reclaimed, some processes are automatically started. As a result, memory is occupied again, causing a bad memory reclaiming effect.

SUMMARY

Embodiments of the present invention disclose a memory reclaiming method and a terminal, to improve a memory reclaiming effect.

According to a first aspect, an embodiment of the present invention provides a memory reclaiming method. The embodiment of the method includes: determining, by a terminal according to a preset rule, a target application program in application programs run on a background, where the target application program is an application program that needs to be cleaned; freezing, by the terminal, the target application program to cause a process of the target application program to be in an uninterruptible sleep state, and reclaiming data generated during running of the process of the target application program in memory; and unfreezing, by the terminal when receiving an input triggering instruction for the target application program, the target application program to cause the process of the target application program to be in an interruptible sleep state, and running the target application program after the target application program is unfrozen.

By performing the foregoing operations, when reclaiming the target application program, the terminal freezes the target application program, so that the terminal unfreezes the target application program only when the terminal receives the triggering instruction that is input by a user for the target application program. This prevents the memory from being occupied again when the process of the target application program is automatically started, and improves a memory reclaiming effect.

With reference to the first aspect, in a first possible embodiment of the first aspect, the determining, by a terminal according to a preset rule, a target application program in application programs run on a background includes: determining that a residual amount of the memory is greater than a preset memory threshold; and determining the target application program according to the preset rule.

It may be understood that, the terminal performs a related operation of cleaning the application program only when the terminal enters a preset idle state, so that no interference is caused to the user; and performing the related operation of cleaning the application program when the residual amount of the memory is greater than the memory threshold may ensure a smooth cleaning procedure.

With reference to the first aspect or the first possible embodiment of the first aspect, in a second possible embodiment of the first aspect, the reclaiming data generated during running of the process of the target application program in memory includes: migrating the data generated during the running of the process of the target application program from the memory to preset storage space. The running the target application program after the target application program is unfrozen includes: loading, after the target application program is unfrozen, the generated data from the storage space to the memory to start the target application program.

It may be understood that, migration of the data generated during the running of the process from the memory to the storage space not only makes space for the memory, but also ensures that the data is not lost. That is, this manner not only ensures that the memory is smoothly reclaimed, but also ensures that next time the user uses the target application program, the user may directly enter an interface on which the user exits the target application last time, to improve user experience.

With reference to the second possible embodiment of the first aspect, in a third possible embodiment of the first aspect, the method further includes: determining, by the terminal, a residual amount of writable data of the storage space. The migrating the data generated during the running of the process of the target application program from the memory to storage space includes: migrating the generated data from the memory to the preset storage space when the data generated during the running of the target application program is not greater than the residual amount of the writable data.

With reference to the third possible embodiment of the first aspect, in a fourth possible embodiment of the first aspect, the determining, by the terminal, a residual amount of writable data of the storage space includes: calculating a total amount of average everyday writable data of the storage space based on a pre-obtained total amount of the writable data of the storage space; and calculating a residual amount of daily writable data of the storage space based on a total amount of daily writable data and a total amount of daily written data.

It may be understood that, control over a total amount of everyday written data of the storage space may ensure that the storage space is not broken down within a pre-estimated life cycle because a quantity of writing times is relatively large.

With reference to the first aspect, the first possible embodiment of the first aspect, the second possible embodiment of the first aspect, the third possible embodiment of the first aspect, or the fourth possible embodiment of the first aspect, in a fifth possible embodiment of the first aspect, the target application program is such an application program that time required to start the application program in a start manner of cold start exceeds a preset time threshold.

It may be understood that, such an application program that a relatively long time is consumed to start the application program in a cold start manner usually occupies relatively large memory, and relatively large memory may be released by selecting such application program to be cleaned. Additionally, data generated during running of a process of such application program is first migrated to the storage space, and then migrated back to the memory when the target application program is restarted later, so that time for restarting the target application program can be shortened significantly.

With reference to the first aspect, the first possible embodiment of the first aspect, the second possible embodiment of the first aspect, the third possible embodiment of the first aspect, the fourth possible embodiment of the first aspect, or the fifth possible embodiment of the first aspect, in a sixth possible embodiment of the first aspect, the freezing, by the terminal, the target application program to cause a process of the target application program to be in an uninterruptible sleep state includes: setting the process of the target application program to a TASK_UNINTERRUPTIBLE state; and the unfreezing the target application program to cause the process of the target application program to be in an interruptible sleep state includes: setting the process of the target application program to a TASK_INTERRUPTIBLE state.

According to a second aspect, an embodiment of the present invention provides a terminal. The terminal includes a determining unit, a reclaiming unit, and an unfreezing unit. The determining unit is configured to determine, according to a preset rule, a target application program in application programs run on a background, where the target application program is an application program that needs to be cleaned; the reclaiming unit is configured to freeze the target application program to cause a process of the target application program to be in an uninterruptible sleep state, and reclaim data generated during running of the process of the target application program in memory; and the unfreezing unit is configured to unfreeze, when an input triggering instruction for the target application program is received, the target application program to cause the process of the target application program to be in an interruptible sleep state, and run the target application program after the target application program is unfrozen.

By running the foregoing units, when reclaiming the target application program, the terminal freezes the target application program, so that the terminal unfreezes the target application program only when the terminal receives the triggering instruction that is input by a user for the target application program. This prevents the memory from being occupied again when the process of the target application program is automatically started, and improves a memory reclaiming effect.

With reference to the second aspect, in a first possible embodiment of the second aspect, the determining unit is specifically configured to determine that a residual amount of the memory is greater than a preset memory threshold, and determine the target application program according to the preset rule.

It may be understood that, the terminal performs a related operation of cleaning the application program only when the terminal enters a preset idle state, so that no interference is caused to the user; and performing the related operation of cleaning the application program when the residual amount of the memory is greater than the memory threshold may ensure a smooth cleaning procedure.

With reference to the second aspect or the first possible embodiment of the second aspect, in a second possible embodiment of the second aspect, the reclaiming unit is specifically configured to migrate the data generated during the running of the process of the target application program from the memory to preset storage space; and the running, by the unfreezing unit, the target application program after the target application program is unfrozen is specifically: loading, after the target application program is unfrozen, the generated data from the storage space to the memory to start the target application program.

It may be understood that, migration of the data generated during the running of the process from the memory to the storage space not only makes space for the memory, but also ensures that the data is not lost. That is, this manner not only ensures that the memory is smoothly reclaimed, but also ensures that next time the user uses the target application program, the user may directly enter an interface on which the user exits the target application last time, to improve user experience.

With reference to the second possible embodiment of the second aspect, in a third possible embodiment of the second aspect, the terminal further includes: a calculation unit, configured to determine a residual amount of writable data of the storage space; and the migrating, by the reclaiming unit, the data generated during the running of the process of the target application program from the memory to preset storage space is specifically: migrating the generated data from the memory to the storage space when the data generated during the running of the target application program is not greater than the residual amount of the writable data.

With reference to the third possible embodiment of the second aspect, in a fourth possible embodiment of the second aspect, the calculation unit is specifically configured to calculate a total amount of average everyday writable data of the storage space based on a pre-obtained total amount of the writable data of the storage space; and calculate a residual amount of daily writable data of the storage space based on a total amount of daily writable data and a total amount of daily written data.

It may be understood that, control over a total amount of everyday written data of the storage space may ensure that the storage space is not broken down within a pre-estimated life cycle because a quantity of writing times is relatively large.

With reference to the second aspect, the first possible embodiment of the second aspect, the second possible embodiment of the second aspect, the third possible embodiment of the second aspect, or the fourth possible embodiment of the second aspect, in a fifth possible embodiment of the second aspect, the target application program is such an application program that time required to start the application program in a start manner of cold start exceeds a preset time threshold.

It may be understood that, such an application program that a relatively long time is consumed to start the application program in a cold start manner usually occupies relatively large memory, and relatively large memory may be released by selecting such application program to be cleaned. Additionally, data generated during running of a process of such application program is first migrated to the storage space, and then migrated back to the memory when the target application program is restarted later, so that time for restarting the target application program can be shortened significantly.

With reference to the second aspect, the first possible embodiment of the second aspect, the second possible embodiment of the second aspect, the third possible embodiment of the second aspect, the fourth possible embodiment of the second aspect, or the fifth possible embodiment of the second aspect, in a sixth possible embodiment of the second aspect, the reclaiming unit is specifically configured to set the process of the target application program to a TASK_UNINTERRUPTIBLE state; and the unfreezing unit is specifically configured to set the process of the target application program to a TASK_INTERRUPTIBLE state.

According to a third aspect, an embodiment of the present invention provides a terminal. The terminal includes a processor, a memory, and a system bus. The memory is configured to store a computer executable instruction, the processor and the memory are connected to each other by using the system bus, and when a computer runs, the processor executes the computer executable instruction stored in the memory, so that the computer performs the memory reclaiming method according to the first aspect or any embodiment of the first aspect.

For details of a description of a technical effect of the third aspect, refer to a related description of a technical effect of the first aspect or any embodiment of the first aspect. Details are not described herein again.

According to a fourth aspect, an embodiment of the present invention provides a storage medium. The storage medium is configured to store an instruction, and when the instruction is run on a terminal, the terminal is caused to perform the method according to the first aspect or any embodiment of the first aspect.

By implementing the embodiments of the present invention, when reclaiming the target application program, the terminal freezes the target application program, so that the terminal unfreezes the target application program only when the terminal receives the triggering instruction that is input by the user for the target application program. This prevents the memory from being occupied again when the process of the target application program is automatically started, and improves the memory reclaiming effect.

BRIEF DESCRIPTION OF DRAWINGS

Accompanying drawings that need to be used in the background or embodiments are simply described below.

DESCRIPTION OF EMBODIMENTS

The following describes the technical solutions in the embodiments of the present invention with reference to the accompanying drawings in the embodiments of the present invention.

A memory reclaiming method provided in the embodiments of the present invention is mainly applied to a terminal device. The terminal may also be referred to as user equipment (UE), a mobile station (MS), a mobile terminal, or the like. Optionally, the terminal may have a capability of communicating with one or more core networks through a radio access network (RAN). For example, the terminal may be a mobile phone (or referred to as a "cellular" phone), or a computer with mobility. For example, the terminal may also be a portable, pocket-sized, handheld, computer built-in, or in-vehicle mobile apparatus. In addition to the terminal, the memory reclaiming method provided in the embodiments of the present invention may also be applied to other types of computer systems.

Figure 1:
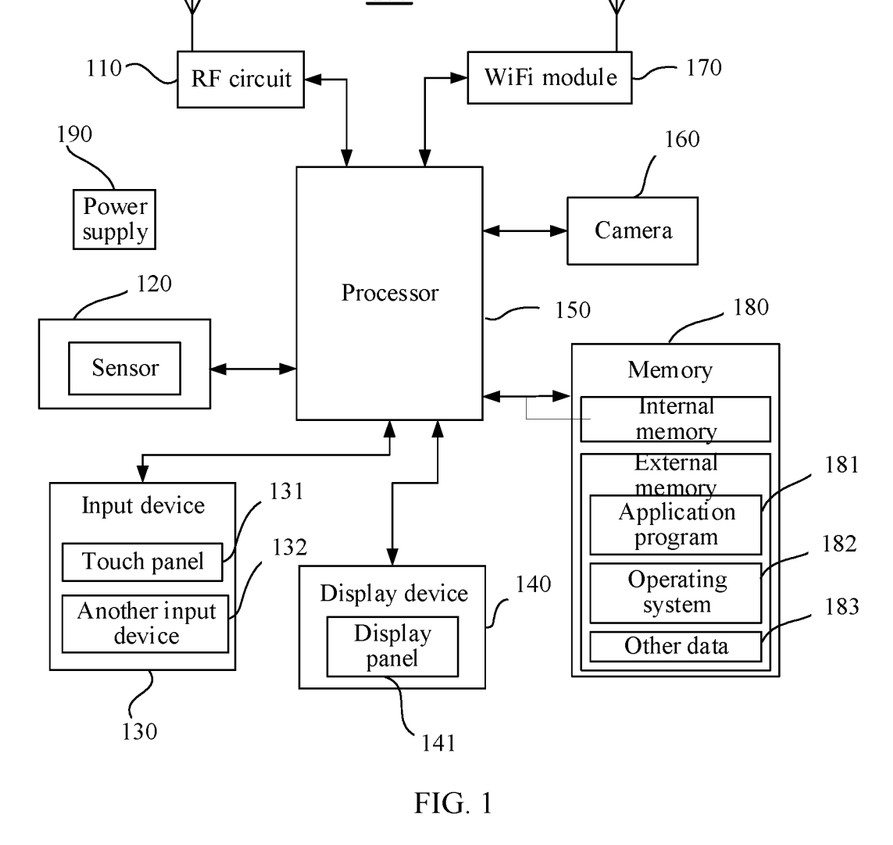
FIG. 1 is a schematic structural diagram of a terminal according to an embodiment of the present invention.

Referring to FIG. 1, FIG. 1 is a schematic structural diagram of a terminal 100 to which an embodiment of the present invention is applied. As shown in FIG. 1, the terminal 100 includes a memory 180, a processor 150, and a display device 140. The memory 180 stores a computer program, and the computer program includes an operating system program 182, an application program 181, and the like. The processor 150 is configured to read the computer program in the memory 180, and then perform a method defined by the computer program. For example, the processor 150 reads the operating system program 182, thereby running an operating system on the terminal 100 and implementing various functions of the operating system, or reads one or more application programs 181, thereby running an application on the terminal.

The processor 150 may include one or more processors. For example, the processor 150 may include one or more central processing units, or include one central processing unit and one graphics processing unit. When the processor 150 includes a plurality of processors, the plurality of processors may be integrated on a same chip, or may respectively be independent chips. One processor may include one or more processing cores. In each of the following embodiments, a plurality of cores are used as an example to perform description, but a memory reclaiming method provided in the embodiments of the present invention may also be applied to a single-core processor.

Additionally, the memory 180 further stores other data 183 other than the computer program, the other data 183 may include data generated after the operating system 182 or the application program 181 is run, and the data includes system data (for example, a configuration parameter of the operating system) and user data (for example, data generated during running of a process). The data generated during the running of the process is also an object reclaimed in this embodiment of the present invention.

The memory 180 usually includes an internal memory and an external memory. The internal memory may be a random access memory (RAM), a read-only memory (ROM), a cache, or the like. Preset storage space described in this embodiment of the present invention belongs to the external memory, and the storage space may include a flash memory (flash), a hard disk, an optical disk, a USB flash drive, a floppy disk, a tape drive, or the like. The computer program is usually stored in the external memory, and before performing processing, the processor loads the computer program from the external memory to the internal memory. An application program in this embodiment of the present invention is usually stored in the external memory, and when the processor runs the application program, the application program needs to be loaded to the internal memory.

The operating system program 182 includes the computer program that may implement the memory reclaiming method provided in the embodiments of the present invention, so that the operating system may be equipped with a memory reclaiming function provided in the embodiments of the present invention after the processor 150 reads the operating system program 182 and runs the operating system. Further, the operating system may open a call interface of the memory reclaiming function to an upper-layer application, and after the processor 150 reads the application program 181 from the memory 180 and runs the application program, the memory reclaiming function provided in the operating system may be called by using the call interface, thereby implementing memory reclaiming.

The terminal 100 may further include an input device 130, configured to receive digital information, character information, or a contact touch operation/non-contact gesture that is input, and generate a signal input and the like related to user setting and function control of the terminal 100. Specifically, in this embodiment of the present invention, the input device 130 may include a touch panel 131. The touch panel 131, also referred to as a touchscreen, may collect a touch operation performed by a user on or nearby the touch panel 131 (for example, an operation performed by the user on the touch panel 131 or near the touch panel 131 by using any suitable object or accessory such as a finger or a stylus), and drive a corresponding connection apparatus based on a preset program. Optionally, the touch panel 131 may include two parts: a touch detection apparatus and a touch controller. The touch detection apparatus detects a touch direction of the user, detects a signal generated from the touch operation, and transfers the signal to the touch controller. The touch controller receives touch information from the touch detection apparatus, converts the touch information into touch point coordinates, and then sends the touch point coordinates to the processor 150. Moreover, the touch controller can receive and execute a command sent from the processor 150. For example, the user clicks an icon of an application program by using a finger on the touch panel 131, the touch detection apparatus detects this signal brought by this click and then transfers the signal to the touch controller, the touch controller then converts this signal into coordinates and sends the coordinates to the processor 150, and the processor 150 performs a related processing operation on the application program based on the coordinates and a type (click or double-click) of the signal, and finally displays an interface of the application program by using the display panel 141.

The touch panel 131 may be implemented in a plurality of types such as a resistive type, a capacitive type, infrared, and a surface acoustic wave. Besides the touch panel 131, the input device 130 may further include another input device 132. The another input device 132 may include, but is not limited to, one or more of a physical keyboard, a function key (for example, a volume control key or a switch key), a track ball, a mouse, a joystick, and the like.

The terminal 100 may further include the display device 140, and the display device 140 includes the display panel 141, configured to display information entered by the user or information provided to the user, various menu interfaces of the terminal 100, and the like. In this embodiment of the present invention, the display panel 141 is mainly configured to display a related interface of each application program. The display device 140 may include the display panel 141. Optionally, the display panel 141 may be configured in a form such as a liquid crystal display (LCD) or an organic light-emitting diode (OLED) display. In some other embodiments, the touch panel 131 may cover the display panel 141, to form a touch display screen.

Besides the foregoing, the terminal 100 may further include a power supply 190 configured to supply power to another module, and a camera 160 configured to take a photograph or a video. The terminal 100 may further include one or more sensors 120 such as an acceleration sensor or a light sensor. The terminal 100 may further include a radio frequency (RF) circuit 110, configured to perform network communication with a wireless network device, and may further include a WiFi module 170, configured to perform WiFi communication with another device.

In the following embodiment, a memory reclaiming method of the embodiments of the present invention is described by using an example in which memory occupied by a process run on a background is reclaimed, and the memory reclaiming method may be implemented in the operating system program 182 shown in FIG. 1.

Figure 2:
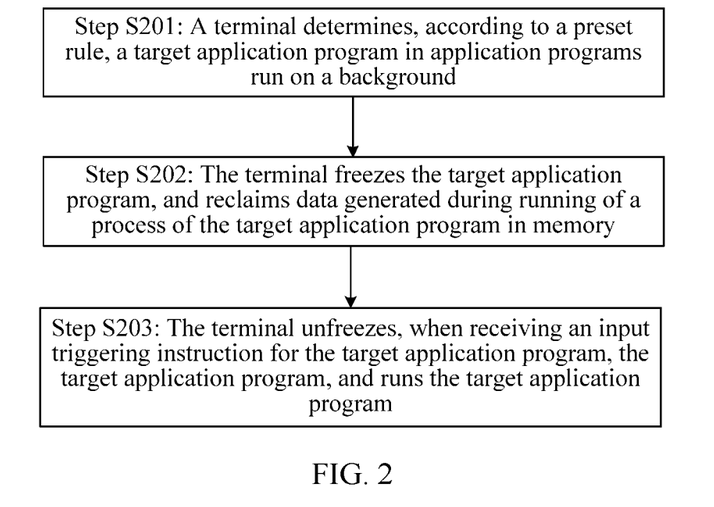
FIG. 2 is a schematic flowchart of a memory reclaiming method according to an embodiment of the present invention.

Referring to FIG. 2, FIG. 2 is a schematic flowchart of a memory reclaiming method according to an embodiment of the present invention. The method may be implemented by the foregoing terminal 100, and the method includes but is not limited to the following steps.

Step S201: A terminal determines, according to a preset rule, a target application program in application programs run in a background.

Specifically, the target application program is an application program that needs to be cleaned, and the preset rule may be set based on an actual need. For example, the determining, by a terminal according to a preset rule, a target application program in application programs run on a background is: comparing memory sizes occupied by the application programs run on the background, and then determining an application program occupying largest memory as an application program that needs to be cleaned. As another example, the determining, by a terminal according to a preset rule, a target application program in application programs run on a background is: collecting statistics on time for which the application programs run on the background have not been continuously used, and then determining such an application program that time for which the application program has not been continuously used exceeds a preset time value as an application program that needs to be cleaned. As yet another example, the determining, by a terminal according to a preset rule, a target application program in application programs run on a background is: determining, in the application programs run on the background, such an application program that time required to start the application program in a cold start manner exceeds a preset time threshold as an application program that needs to be cleaned (for example, determining such an application program that time consumed to start the application program in the cold start manner exceeds 2.5 seconds as an application program that needs to be cleaned). In embodiments of an actual application, a manner of starting an application program includes cold start and hot start. With a cold start, the terminal does not run a related process of a to-be-started application program in the background, so that when the application program is started, an Application type is first created and initialized, then a MainActivity type (which includes a series of measurement, deployment, drawing, and the like) is created and initialized, and then information related to the application program is output to a user. By contrast, with a hot start, the terminal runs a related process of a to-be-started application program on the background, so that when the application program is started, an Application type does not need to be created and initialized, but instead MainActivity is directly created and initialized, and then information related to the application program is output to the user. The preset rule further has other possibilities, and examples are not listed herein one by one.

Further, when entering a preset idle state, the terminal may further determine that a residual amount of memory is greater than a preset memory threshold; and then determine the target application program according to the preset rule. The idle state herein is a state in which the user has not operated the terminal, and representation forms of having not operated the terminal include that a display screen of the terminal is off, a display screen of the terminal is locked, the terminal enters a standby state, and so on. The memory threshold is a preset value used to represent a memory size. Additionally, whether the residual amount of the memory is less than another threshold may be further determined. If the residual amount of the memory is less than the another threshold, it indicates that the memory may be inadequate subsequently. Therefore, only when the residual amount of the memory is greater than the preset memory threshold and less than the another threshold, an application program that needs to be cleaned and that is of the application programs run on the background is determined according to the preset rule. For example, when the terminal is a mobile phone, the memory threshold may be set to 600 M, and the another threshold is set to 1 G. Therefore, when memory of the mobile phone is greater than 600 M and less than 1 G, an application program that needs to be cleaned and that is of the application programs run on the background may be determined according to the preset rule. It may be understood that, the terminal performs a related operation of cleaning the application program only when the terminal enters the preset idle state, so that no interference is caused to the user; and performing the related operation of cleaning the application program when the residual amount of the memory is greater than the memory threshold may ensure a smooth cleaning procedure.

Step S202: The terminal freezes the target application program to cause a process of the target application program to be in an uninterruptible sleep state, and reclaims data generated during running of the process of the target application program in memory.

Specifically, the determined application program that needs to be cleaned may be referred to as the target application program, a technology used for freezing may be a process freezing technology (freezing of tasks) in a Linux™ system, and a procedure of freezing a process to cause the process to enter an uninterruptible sleep state may be: 1. A TIF_SIGPENDING flag of the process is set in a kernel; and 2. In the process, a flag bit is detected in user mode, and if the TIF_SIGPENDING flag is set at the flag bit, the process is set to a TASK_UNINTERRUPTIBLE state. A person skilled in the art may understand that, in a derived system based on a Linux™ kernel, for example, an Android™ system, a process may be frozen based on the foregoing manner. In a specific implementation, because of a related change of the derived system, names of flag bits for setting uninterruptible and interruptible sleep states may change, but this name change does not affect technical essence when the technical solutions of the present invention are implemented. However, in another system (for example, a Windows™ system), the target application may also be frozen as discussed above in the Linux System™, so that the process of the target application enters the uninterruptible sleep state.

After the target application program is frozen, the process of the target application program is started only after human triggering, thereby preventing the memory from being occupied again because the process of the application program is frequently automatically started after the memory is reclaimed. Optionally, the data generated during the running of the process of the target application program described herein may be specifically data generated by all processes of the target application program that are being run. In a specific operation, a user identifier (UID) of the target application program may be first determined, and then a process whose UID of UIDs included in processes that are currently being run is the same as the UID of the target application program is determined as a process of the target application program that is being run. It should be noted that, data generated during running of a process of the target application program may include an anonymous memory page and a file memory page generated during the running of the process. The anonymous memory page includes memory of a heap and a stack occupied by a program of the process, and memory that has no corresponding backup file in a file system. The file memory page includes memory occupied by a file in a buffer when the process is run to read/write the file. In an optional solution, the reclaiming data generated during running of the process of the target application program in memory may be: migrating the data generated during the running of the process of the target application program from the memory to preset storage space. Specifically, after the target application program is frozen, the data generated during the running of the process of the target application program may be migrated from the memory to the storage space, to make space for the memory and ensure that the data generated during the running of the process of the target application program is not lost. The storage space herein may be a storage medium, or a part of space in a storage medium, for example, a swap in ZSwap. Further, the storage space has a corresponding useful life. For example, it is required that a loss of some storage space within three years cannot exceed 5%. If the loss of the storage space needs to be controlled, a total amount of written data of the storage space needs to be controlled. In this embodiment of the present invention, the total amount of the written data of the storage space is controlled in the following manner.

The terminal calculates a residual amount of writable data of the storage space based on a pre-obtained total amount of the writable data of the storage space and a total amount of the written data of the storage space. In this way, the migrating the data generated during the running of the process of the target application program in the memory from the memory to storage space may be: migrating the generated data from the memory to the storage space when the data generated during the running of the target application program is not greater than the residual amount of the writable data. Furthermore, an amount of data written to the storage space everyday may be further limited. That is, the calculating, by the terminal, a residual amount of writable data of the storage space based on a pre-obtained total amount of the writable data of the storage space and a total amount of the written data of the storage space is specifically: calculating a total amount of average everyday writable data of the storage space based on a pre-obtained total amount of the writable data of the storage space; and calculating a residual amount of daily writable data of the storage space based on a total amount of daily writable data and a total amount of daily written data. For example, if a condition that a loss of the storage space within three years does not exceed 5% needs to be satisfied, a total amount of written data of the storage space needs to be controlled not to exceed 1095 G. If the 1095 G is split to each day within the three years, the total amount of the everyday writable data is 1095÷3÷365=1 G. If the total amount of the daily written data of the terminal is 0.8 G, the residual amount of the daily writable data is 1−0.8=0.2 G.

After the residual amount of the daily writable data is calculated, the terminal first determines whether the data generated during the running of the process of the target application program is not greater than the residual amount of the daily writable data. If the data generated during the running of the process of the target application program is not greater than the residual amount of the daily writable data, the data generated during the running of the process of the target application program is migrated to the storage space. If the data generated during the running of the process of the target application program is not greater than the residual amount of the daily writable data, the data generated during the running of the process of the target application program is not migrated to the storage space, but instead the data generated during the running of the process of the target application program is cleared from the memory. Optionally, a file in the storage space may be mounted again by using a tempfs file system, to prevent the file in the storage space from being exposed to the user, ensuring security of data stored in the storage space.

Step S203: The terminal unfreezes, when receiving an input triggering instruction for the target application program, the target application program to cause the process of the target application program to be in an interruptible sleep state, and runs the target application program after the target application program is unfrozen.

Specifically, the user may input the triggering instruction for the target application program to the terminal in a manner such as touching a virtual key, sound control, or gesture control. Correspondingly, the terminal receives the triggering instruction, then unfreezes the target application program based on the triggering instruction, and runs the target application program. The unfreezing the target application program is specifically unfreezing frozen processes of the target application program, to cause these processes to enter the interruptible sleep state.

In a Linux™ system, for example, a procedure of unfreezing a frozen process to cause the process to enter the interruptible sleep state may be: clearing, based on the triggering instruction input by the user, the TIF_SIGPENDING flag of the process of the target application program that is set in the kernel, setting the process to the TASK_INTERRUPTIBLE state, and receiving, in user mode, a wake-up event sent when the process is set to the TASK_INTERRUPTIBLE state. So far, the target application program is awakened, that is, the target application program is unfrozen. In another system (for example, a Windows™ system), the target application may also be unfrozen as discussed above in the Linux System™, so that the process of the target application enters the interruptible sleep state.

In an optional solution, when the data generated during the running of the process of the target application program is migrated from the memory to the preset storage space, the running the target application program after the target application program is unfrozen may be: loading the generated data from the storage space to the memory to start the target application program. Optionally, the data generated during the running of the process of the target application program may be loaded from the storage space to the memory while the target application program is unfrozen, instead of loading the data generated during the running of the process of the target application program from the storage space to the memory only when the process of the target application program is read from the memory and a missing page is found after the target application program is unfrozen. Optionally, a priority of a read/write operation generated because of the missing page in the process may be further set to be higher than a priority of another read/write operation of the process, so that when a plurality of read/write operations need to be processed simultaneously, the read/write operation generated because of the missing page is preferably processed. In this way, the target application program may be started relatively smoothly.

It should be noted that, in a procedure in which the data generated during the running of the process of the target application program is migrated from the memory to a magnetic disk, an anonymous memory page generated when each process is run may be compressed by using a process as a unit, then data obtained after a plurality of anonymous memory pages are compressed forms a new page, then the new page is migrated to the storage space, the new page may be migrated to the memory when the target application program needs to be run again subsequently, the new page is decompressed in the memory to restore the foregoing plurality of anonymous memory pages, and then the plurality of anonymous memory pages are read to run the target application program. For example, a unit of a page is usually 4 K. If a compression ratio of an anonymous memory page is 50%, each anonymous memory page has a size of 2 K after being compressed, and two anonymous memory pages have a size of 2K+2K=4K after being compressed. Therefore, data obtained after two anonymous memory pages are compressed may form a new page, a structure of the new page is tagged to distinguish parts in the new page that respectively correspond to the two anonymous memory pages, and the two anonymous memory pages may be restored based on information about a tag when the new page is decompressed subsequently. It may be understood that, migration of the anonymous memory page after being compressed to the storage space may reduce read/write overheads of the storage space, thereby improving a useful life of the storage space.

It should be noted that, when memory is reclaimed, an anonymous memory page of a process that has not been used for a relatively short time may be stored in a buffer, and an anonymous memory page of a process that has not been used for a relatively long time may be migrated to the storage space. A probability that the terminal runs the process that has not been used for a relatively short time is relatively large. Therefore, such practice may greatly probably improve efficiency of reading an anonymous memory page by the terminal.

In the method described in FIG. 2, when reclaiming the target application program, the terminal freezes the target application program, so that the terminal unfreezes the target application program only when the terminal receives the triggering instruction that is input by the user for the target application program, to prevent the memory from being occupied again because the process of the target application program is automatically started, and improve a memory reclaiming effect.

The specific process of the method provided in the embodiments of the present invention is mainly described above, and an implementation location and a running status of the method provided in the embodiments of the present invention are described below with reference to FIG. 3 by using an Android operating system as an example. For a more specific method process, refer to the foregoing embodiment.

Figure 3:
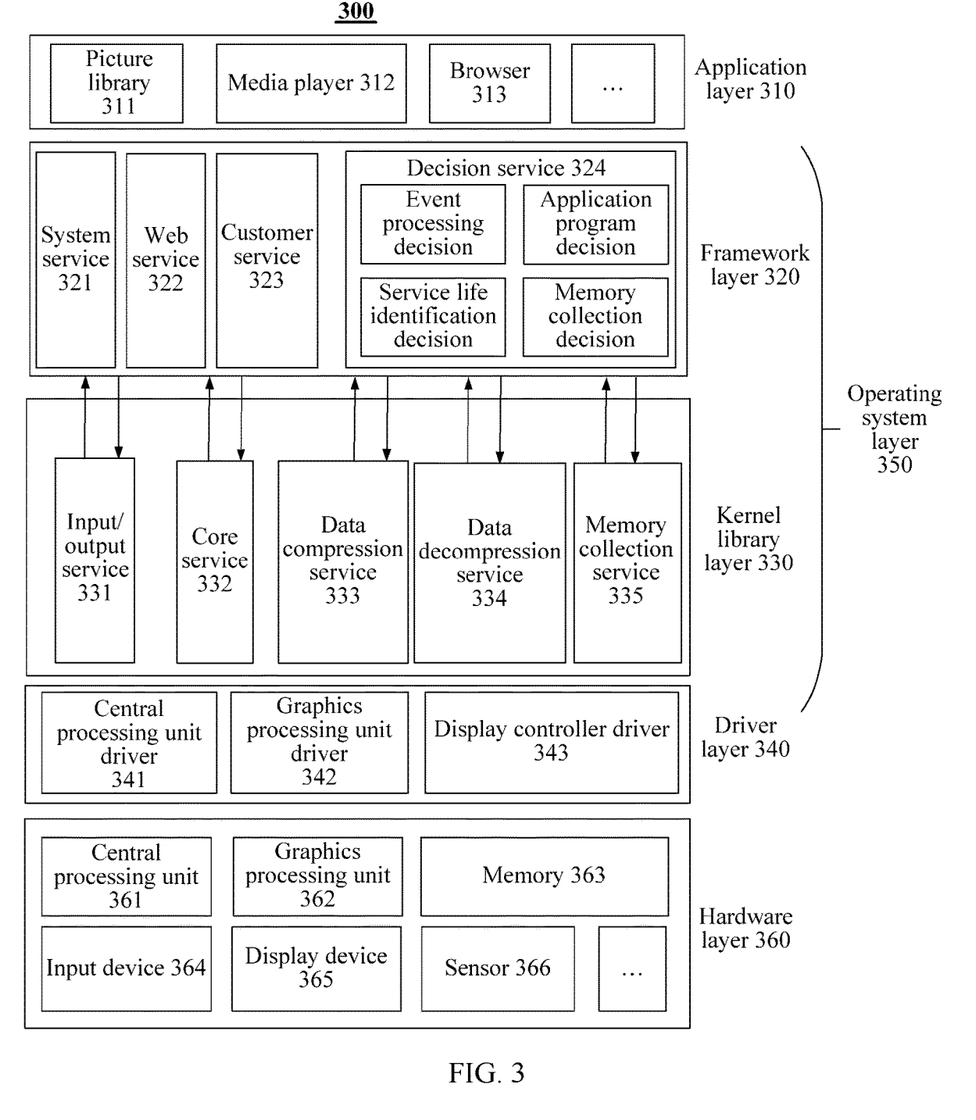
FIG. 3 is a schematic structural diagram of another terminal according to an embodiment of the present invention.

Referring to FIG. 3, FIG. 3 is a schematic structural diagram of a terminal 300 according to an embodiment of the present invention. The terminal 300 includes an application layer 310 and an operating system layer 350, and the operating system may be an Android operating system. The operating system layer 350 is further divided into a framework layer 320, a kernel library layer 330, and a driver layer 340. The operating system layer 350 in FIG. 3 may be considered as a specific implementation of the operating system 182 in FIG. 1, and the application layer 310 in FIG. 3 may be considered as a specific implementation of the application program 181 in FIG. 1. The driver layer 340 includes a CPU driver 341, a GPU driver 342, a display controller driver 343, and the like. The kernel library layer 330 is a core part of the operating system, and includes an input/output service 331, a core service 332, a data compression service 333, a data decompression service 334, a memory reclaiming service 335, and the like. The data compression service 333 is used to compress data reclaimed during memory reclaiming, the data decompression service 334 is used to decompress data read from storage space and then load the decompressed data to memory for running, and the memory reclaiming service 335 is used to reclaim data generated during running of a process of an application program. The framework layer 320 may include a decision service 324, a system service 321, a web service 322, a customer service 323, and the like. The decision service 324 may include an event processing decision, an application program decision, a service life identification decision, a memory reclaiming decision, and the like. The event processing decision is used to define effects of various events, the application program decision is used to determine an application program that needs to be cleaned (for example, determine such an application program that time consumed to start the application program in a cold start manner exceeds 2.5 seconds as an application program that needs to be cleaned), the service life identification decision is used to obtain a useful life of storage space, and the memory reclaiming decision defines a memory reclaiming manner (for example, reclaiming memory by using an application program as a unit). The application layer 310 may include a picture library 311, a media player 312, a browser 313, and the like.

Additionally, under the driver layer 340, the terminal 300 further includes a hardware layer 360. The hardware layer of the terminal 300 may include a central processing unit (CPU) 361 and a graphics processing unit (GPU) 362 (which is equivalent to a specific implementation of the processor 150 in FIG. 1), may further include a memory 363 (which is equivalent to the memory 180 in FIG. 1), including an internal memory and an external memory, may further include an input device 364 (which is equivalent to the input device 132 in FIG. 1) and a display device 365 (which is equivalent to the display device 140 in FIG. 1) such as a liquid crystal display (LCD), holographic imaging, or a projector, and may further include one or more sensors 366 (which are equivalent to the sensor 120 in FIG. 1). Certainly, in addition, the hardware layer 360 may further include the power supply, the camera, the RF circuit, and the WiFi module that are shown in FIG. 1, and may further include other hardware modules not shown in FIG. 1, for example, a memory controller and a display controller.

The method in the embodiments of the present invention is described in detail above. For ease of better implementing the foregoing solutions in the embodiments of the present invention, an apparatus in an embodiment of the present invention is correspondingly provided in the following.

Figure 4:
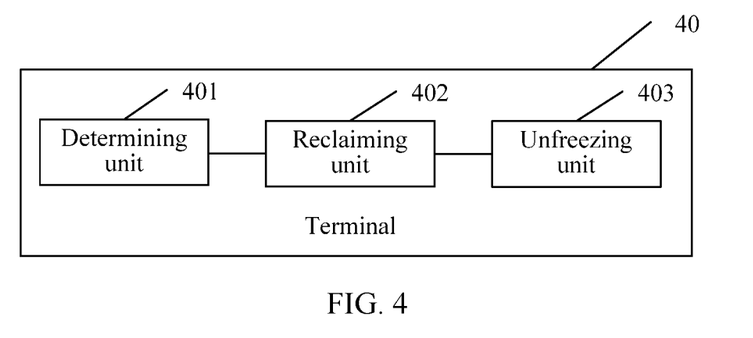
FIG. 4 is a schematic structural diagram of still another terminal according to an embodiment of the present invention.

Referring to FIG. 4, FIG. 4 is a schematic structural diagram of a terminal 40 according to an embodiment of the present invention. The terminal 40 may include a determining unit 401, a reclaiming unit 402, and an unfreezing unit 403. The determining unit 401 is configured to determine, according to a preset rule, a target application program in application programs run on a background, where the target application program is an application program that needs to be cleaned. The reclaiming unit 402 is configured to freeze the target application program to cause a process of the target application program to be in an uninterruptible sleep state, and reclaim data generated during running of the process of the target application program in memory. The unfreezing unit 403 is configured to unfreeze, when an input triggering instruction for the target application program is received, the target application program to cause the process of the target application program to be in an interruptible sleep state, and run the target application program after the target application program is unfrozen.

By running the foregoing units, when reclaiming the target application program, the terminal freezes the target application program, so that the terminal unfreezes the target application program only when the terminal receives the triggering instruction that is input by a user for the target application program, to prevent the memory from being occupied again because the process of the target application program is automatically started, and improve a memory reclaiming effect.

In an optional solution, the determining unit is specifically configured to determine that a residual amount of the memory is greater than a preset memory threshold, and determine the target application program according to the preset rule.

It may be understood that, the terminal performs a related operation of cleaning the application program only when the terminal enters a preset idle state, so that no interference is caused to the user; and performing the related operation of cleaning the application program when the residual amount of the memory is greater than the memory threshold may ensure a smooth cleaning procedure.

In another optional solution, the reclaiming unit 402 is specifically configured to migrate the data generated during the running of the process of the target application program from the memory to preset storage space; and the running, by the unfreezing unit 403, the target application program after the target application program is unfrozen is specifically: loading, after the target application program is unfrozen, the generated data from the storage space to the memory to start the target application program.

It may be understood that, migration of the data generated during the running of the process from the memory to the storage space not only makes space for the memory, but also ensures that the data is not lost. That is, this manner not only ensures that the memory is smoothly reclaimed, but also ensures that next time the user uses the target application program, the user may directly enter an interface on which the user exits the target application last time, to improve user experience.

In another optional solution, the storage space includes a swap used to store data generated during running of each process, and the terminal 40 further includes a calculation unit. The calculation unit is configured to determine a residual amount of writable data of the storage space; and the migrating, by the reclaiming unit, the data generated during the running of the process of the target application program from the memory to preset storage space is specifically: migrating the generated data from the memory to the preset storage space when the data generated during the running of the target application program is not greater than the residual amount of the writable data.

In another optional solution, the calculation unit is specifically configured to calculate a total amount of average everyday writable data of the storage space based on a pre-obtained total amount of the writable data of the storage space; and calculate a residual amount of daily writable data of the storage space based on a total amount of daily writable data and a total amount of daily written data.

It may be understood that, control over a total amount of everyday written data of the storage space may ensure that the storage space is not broken down within a pre-estimated life cycle because a quantity of writing times is relatively large.

In another optional solution, the target application program is such an application program that time required to start the application program in a start manner of cold start exceeds a preset time threshold.

It may be understood that, such an application program that a relatively long time is consumed to start the application program in a cold start manner usually occupies relatively large memory, and relatively large memory may be released by selecting such application program to be cleaned. Additionally, data generated during running of a process of such application program is first migrated to the storage space, and then migrated back to the memory when the target application program is restarted later, so that time for restarting the target application program can be shortened significantly.

In another optional solution, the reclaiming unit 402 is specifically configured to set the process of the target application program to a TASK_UNINTERRUPTIBLE state; and the unfreezing unit 403 is specifically configured to set the process of the target application program to a TASK_INTERRUPTIBLE state.

For specific implementations of the units in this embodiment of the present invention, further correspondingly refer to the corresponding description of the method embodiment shown in FIG. 2.

In the terminal 40 described in FIG. 4, when reclaiming the target application program, the terminal 40 freezes the target application program, so that the terminal unfreezes the target application program only when the terminal receives the triggering instruction that is input by the user for the target application program, to prevent the memory from being occupied again because the process of the target application program is automatically started, and improve the memory reclaiming effect.

To sum up, by implementing the embodiments of the present invention, when reclaiming the target application program, the terminal freezes the target application program, so that the terminal unfreezes the target application program only when the terminal receives the triggering instruction that is input by the user for the target application program, to prevent the memory from being occupied again because the process of the target application program is automatically started, and improve the memory reclaiming effect.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

The invention claimed is:

1. A memory reclaiming method, comprising:
   determining, by a terminal according to a preset rule, a target application program in application programs run in a background, wherein the target application program is an application program that needs to be cleaned;
   freezing, by the terminal, the target application program to cause a process of the target application program to be in an uninterruptible sleep state, and reclaiming data generated during running of the process of the target application program in memory; and
   unfreezing, by the terminal when receiving an input triggering instruction from a user for the target application program, the target application program to cause the process of the target application program to be in an interruptible sleep state, and running the target application program after the target application program is unfrozen;
   wherein
   the freezing, by the terminal, the target application program to cause the process of the target application program to be in the uninterruptible sleep state comprises: setting a TIF_SIGPENDING flag of the process of the target application program in a kernel indicating a pending signal and preventing the target application program from running a background process, detecting the set TIF_SIGPENDING flag in a user mode, and when the TIF_SIGPENDING flag is set in the user mode, setting the process of the target application program to a TASK_UNINTERRUPTIBLE state; and
   the unfreezing the target application program to cause the process of the target application program to be in the interruptible sleep state comprises:
   determining a user identifier (UID) associated with the target application,
   determining, from among a plurality of processes each associated with one or more UIDs, that the UID associated with the target application program matches a UID associated with the process, and
   clearing, based on the input triggering instruction and the determination of a UID match, the TIF_SIGPENDING flag of the process of the target application program that is set in the kernel, setting the process to the TASK_INTERRUPTIBLE state when the TIF_SIGPENDING flag is cleared, and receiving, in the user mode, a wake-up event sent when the process is set to the TASK_INTERRUPTIBLE state;
   wherein the reclaiming data generated during running of the process of the target application program in memory comprises:
   migrating the data generated during the running of the process of the target application program from the memory to preset storage space; and
   the running the target application program after the target application program is unfrozen comprises:
   loading, after the target application program is unfrozen, the generated data from the storage space to the memory to start the target application program;
   wherein the method further comprises:
   determining, by the terminal, a residual amount of writable data of the storage space by: calculating a total amount of average everyday writable data of the storage space based on a pre-obtained total amount of the writable data of the storage space, and calculating a residual amount of daily writable data of the storage space based on a total amount of daily writable data and a total amount of daily written data, wherein when a condition that a loss of the storage space within a predetermined time period is not to exceed a proportion of the storage space is to be satisfied, a total amount of written data of the storage space is controlled not to exceed a predetermined maximum amount; and
the migrating the data generated during the running of the process of the target application program from the memory to preset storage space comprises:
migrating the generated data from the memory to the preset storage space when the data generated during the running of the target application program is not greater than the residual amount of the writable data.

2. The method according to claim 1, wherein the determining, by the terminal according to the preset rule, the target application program in application programs run in the background comprises:
determining that a residual amount of the memory is greater than a preset memory threshold; and
determining the target application program according to the preset rule.

3. The method according to claim 1, wherein a time required to restart the target application program with a cold start exceeds a preset time threshold.

4. The method according to claim 1, wherein the predetermined time period comprises a number of years, the proportion of the storage space comprises a percentage of the storage space, and the predetermined maximum amount comprises a predetermined number of gigabytes of data.

5. The method according to claim 1, wherein the number of years comprises three years, the proportion of the storage space comprises 5% of the storage space, and the predetermined number of gigabytes of data comprises 1095 gigabytes.

6. A terminal, comprising:
a memory; and
a processor coupled with the memory configured to perform operations comprising:
determining, according to a preset rule, a target application program in application programs run in a background, wherein the target application program is an application program that needs to be cleaned;
freezing the target application program to cause a process of the target application program to be in an uninterruptible sleep state, and reclaiming data generated during running of the process of the target application program in the memory; and
unfreezing, when an input triggering instruction for the target application program is received from a user, the target application program to cause the process of the target application program to be in an interruptible sleep state, and running the target application program after the target application program is unfrozen;
wherein
the freezing the target application program to cause the process of the target application program to be in the uninterruptible sleep state comprises: setting a TIF_SIGPENDING flag of the process of the target application program in a kernel indicating a pending signal and preventing the target application program from running a background process, detecting the set TIF_SIGPENDING flag in a user mode, and when the TIF_SIGPENDING flag is set in the user mode, setting the process of the target application program to a TASK_UNINTERRUPTIBLE state; and
the freezing the target application program to cause the process of the target application program to be in the interruptible sleep state comprises:
determining a user identifier (UID) associated with the target application,
determining, from among a plurality of processes each associated with one or more UIDs, that the UID associated with the target application program matches a UID associated with the process, and
clearing, based on the input triggering instruction and the determination of a UID match, the TIF_SIGPENDING flag of the process of the target application program that is set in the kernel, setting the process to the TASK_INTERRUPTIBLE state when the TIF_SIGPENDING flag is cleared, and receiving, in the user mode, a wake-up event sent when the process is set to the TASK_INTERRUPTIBLE state;
wherein the processor is further configured to perform operations, comprising:
migrating the data generated during the running of the process of the target application program from the memory to preset storage space; and
the running the target application program after the target application program is unfrozen comprises loading, after the target application program is unfrozen, the generated data from the storage space to the memory to start the target application program;
wherein the processor is further configured to perform operations, comprising:
determining a residual amount of writable data of the storage space by: calculating a total amount of average everyday writable data of the storage space based on a pre-obtained total amount of the writable data of the storage space, and calculating a residual amount of daily writable data of the storage space based on a total amount of daily writable data and a total amount of daily written data, wherein when a condition that a loss of the storage space within a predetermined time period is not to exceed a proportion of the storage space is to be satisfied, a total amount of written data of the storage space is controlled not to exceed a predetermined maximum amount; and
the migrating the data generated during the running of the process of the target application program from the memory to preset storage space further comprises:
migrating the generated data from the memory to the preset storage space when the data generated during the running of the target application program is not greater than the residual amount of the writable data.

7. The terminal according to claim 6, wherein the processor is further configured to perform operations, comprising: determining that a residual amount of the memory is greater than a preset memory threshold, and determining the target application program according to the preset rule.

8. The terminal according to claim 6, wherein a time required to restart the target application program with a cold start exceeds a preset time threshold.

9. A non-transitory storage medium, having an instruction stored thereon, which when executed on a terminal, the terminal performs operations comprising:
determining, by the terminal according to a preset rule, a target application program in application programs run in a background, wherein the target application program is an application program that needs to be cleaned;
freezing, by the terminal, the target application program to cause a process of the target application program to be in an uninterruptible sleep state, and reclaiming data generated during running of the process of the target application program in memory; and
unfreezing, by the terminal when receiving an input triggering instruction from a user for the target application program, the target application program to cause the process of the target application program to be in an interruptible sleep state, and running the target application program after the target application program is unfrozen;
wherein
the freezing, by the terminal, the target application program to cause the process of the target application program to be in the uninterruptible sleep state comprises: setting a TIF_SIGPENDING flag of the process of the target application program in a kernel indicating a pending signal and preventing the target application program from running a background process, detecting the set TIF_SIGPENDING flag in a user mode, and when the TIF_SIGPENDING flag is set in the user mode, setting the process of the target application program to a TASK_UNINTERRUPTIBLE state; and
the unfreezing the target application program to cause the process of the target application program to be in the interruptible sleep state comprises:
  determining a user identifier (UID) associated with the target application,
  determining, from among a plurality of processes each associated with one or more UIDs, that the UID associated with the target application program matches a UID associated with the process, and
  clearing, based on the input triggering instruction and the determination of a UID match, the TIF_SIGPENDING flag of the process of the target application program that is set in the kernel, setting the process to the TASK_INTERRUPTIBLE state when the TIF_SIGPENDING flag is cleared, and receiving, in the user mode, a wake-up event sent when the process is set to the TASK_INTERRUPTIBLE state;
wherein the reclaiming data generated during running of the process of the target application program in memory comprises:
migrating the data generated during the running of the process of the target application program from the memory to preset storage space; and
the running the target application program after the target application program is unfrozen comprises:
loading, after the target application program is unfrozen, the generated data from the storage space to the memory to start the target application program;
wherein the operations further comprises:
  determining, by the terminal, a residual amount of writable data of the storage space by: calculating a total amount of average everyday writable data of the storage space based on a pre-obtained total amount of the writable data of the storage space, and calculating a residual amount of daily writable data of the storage space based on a total amount of daily writable data and a total amount of daily written data, wherein when a condition that a loss of the storage space within a predetermined time period is not to exceed a proportion of the storage space is to be satisfied, a total amount of written data of the storage space is controlled not to exceed a predetermined maximum amount; and
  the migrating the data generated during the running of the process of the target application program from the memory to preset storage space comprises:
migrating the generated data from the memory to the preset storage space when the data generated during the running of the target application program is not greater than the residual amount of the writable data.

* * * * *

UNITED STATES PATENT AND TRADEMARK OFFICE
CERTIFICATE OF CORRECTION

| | |
|---|---|
| PATENT NO. | : 11,822,805 B2 |
| APPLICATION NO. | : 16/367646 |
| DATED | : November 21, 2023 |
| INVENTOR(S) | : Qiulin Chen, Bailin Wen and Xiaojun Duan |

It is certified that error appears in the above-identified patent and that said Letters Patent is hereby corrected as shown below:

In the Claims

In Claim 6, Column 18, Line 5, delete "the freezing the target" and insert --the unfreezing the target--.

Signed and Sealed this
Twenty-third Day of April, 2024

*Katherine Kelly Vidal*

Katherine Kelly Vidal
*Director of the United States Patent and Trademark Office*